(12) United States Patent
Jang

(10) Patent No.: US 7,986,350 B2
(45) Date of Patent: Jul. 26, 2011

(54) MOBILE TERMINAL AND OPERATING METHOD THEREOF

(75) Inventor: Min Chul Jang, Gyeongi-do (KR)

(73) Assignee: LG Electronics Inc., Seoul (KR)

( * ) Notice: Subject to any disclaimer, the term of this patent is extended or adjusted under 35 U.S.C. 154(b) by 1040 days.

(21) Appl. No.: 11/266,121

(22) Filed: Nov. 2, 2005

(65) Prior Publication Data

US 2006/0092294 A1    May 4, 2006

(30) Foreign Application Priority Data

Nov. 4, 2004   (KR) .................. 10-2004-0089288

(51) Int. Cl.
*H04N 5/76* (2006.01)

(52) U.S. Cl. ................................... 348/231.3

(58) Field of Classification Search ............. 348/231.99, 348/231.2, 231.3, 231.5, 231.6, 231.1, 231.9
See application file for complete search history.

(56) References Cited

U.S. PATENT DOCUMENTS

| | | | | |
|---|---|---|---|---|
| 5,164,831 | A * | 11/1992 | Kuchta et al. | 348/231.7 |
| 5,528,293 | A * | 6/1996 | Watanabe | 348/231.2 |
| 5,903,309 | A * | 5/1999 | Anderson | 348/333.02 |
| 6,310,647 | B1 * | 10/2001 | Parulski et al. | 348/231.99 |
| 6,711,637 | B2 * | 3/2004 | Tateyama | 710/65 |
| 6,912,531 | B1 * | 6/2005 | Matsumoto et al. | 707/10 |
| 6,993,196 | B2 * | 1/2006 | Sun et al. | 382/233 |
| 7,110,026 | B2 * | 9/2006 | Feldis, III | 348/231.6 |
| 7,197,158 | B2 * | 3/2007 | Camara et al. | 382/100 |
| 7,324,135 | B2 * | 1/2008 | Ouchi et al. | 348/218.1 |
| 7,436,440 | B2 * | 10/2008 | Tagawa | 348/231.2 |
| 2004/0141069 | A1 * | 7/2004 | Nakami | 348/231.6 |
| 2004/0174434 | A1 | 9/2004 | Walker et al. | |
| 2005/0151986 | A1 * | 7/2005 | Hisatomi et al. | 358/1.13 |
| 2006/0110154 | A1 * | 5/2006 | Hulsen et al. | 396/310 |
| 2006/0132620 | A1 * | 6/2006 | Takada et al. | 348/231.3 |
| 2006/0269147 | A1 * | 11/2006 | Shen et al. | 382/232 |

FOREIGN PATENT DOCUMENTS

| | | |
|---|---|---|
| KR | 100481588 B1 | 3/2005 |
| WO | WO 2004/057892 A1 | 7/2004 |
| WO | WO 2004/066613 A2 | 8/2004 |

OTHER PUBLICATIONS

"Exchangeable image file format for digital still cameras: Exif Version 2.2", Japan Electronics and Information Technology Industries Association, Apr. 2002.*

* cited by examiner

*Primary Examiner* — Lin Ye
*Assistant Examiner* — Chriss S Yoder, III
(74) *Attorney, Agent, or Firm* — Lee, Hong, Degerman, Kang & Waimey

(57) ABSTRACT

A mobile terminal is provided. The mobile terminal includes a shot setting part, an image input part, a meta information extractor, and a meta information inserting part. The shot setting part sets shooting conditions and the image input part photographs an image using an optical zoom lens under the set shooting conditions and processes the photographed image. The meta information extractor extracts the shooting conditions set by the shot setting part as meta information and the meta information inserting part inserts the meta information extracted from the meta information extractor into the image processed by the image input part.

25 Claims, 9 Drawing Sheets

Fig. 3

| | | |
|---|---|---|
| 10 | SHOOTING INFORMATION | ISO SETTING VALUE |
| | | EXPOSURE TIME |
| | | FOCAL LENGTH |
| | | SHUTTER SPEED |
| | | NUMERICAL APERTURE |
| | | WHETHER FLASH IS USED |
| 20 | IMAGE INFORMATION | IMAGE SIZE |
| | | IMAGE RESOLUTION |
| 30 | FILE INFORMATION | FILE GENERATION DATE |
| | | FILE NAME |
| 40 | DEVICE INFORMATION | MANUFACTURING COMPANY |
| | | MODEL NAME |

Fig. 6

| | TAG NAME | TAG FIELD | HEX CODE | DATA FILE | NUMBER OF COMPONENTS |
|---|---|---|---|---|---|
| a1 | CAMERA MANUFAC-TURING COMPANY | Make | 0x010F | String | NOT SET |
| a2 | CAMERA MODEL | Model | 0x0110 | " | NOT SET |
| a3 | EXPOSURE TIME | Exposure Time | 0x829A | Float | 1 |
| a4 | NUMERICAL APERTURE | F number | 0x829D | " | 1 |
| a5 | ISO VALUE | ISO Speed Ratings | 0x8827 | Short | 2 |
| a6 | SHUTTER SPEED | Shutter Speed Value | 0x9201 | Float | 1 |
| a7 | LENS DIAMETER | Aperture Value | 0x9202 | " | 1 |
| a8 | WHETHER FLASH IS USED | Flash | 0x9209 | Short | 1 |
| a9 | FOCAL LENGTH | Focal Length | 0x920A | Float | 1 |

Fig. 7

|  | TAG FIELD | FORMAT | NUMBER OF COMPONENTS | COMPONENT BYTE |
|---|---|---|---|---|
| b1 | Make | ascii string | NOT SET | 1 |
| b2 | Model | " | NOT SET | 1 |
| b3 | Exposure Time | unsigned rational | 1 | 8 |
| b4 | F number | " | 1 | 8 |
| b5 | ISO Speed Ratings | unsigned short | 2 | 2 |
| b6 | Shutter Speed Value | signed short | 1 | 8 |
| b7 | Aperture Value | unsigned rational | 1 | 8 |
| b8 | Flash | unsigned short | 1 | 2 |
| b9 | Focal Length | unsigned rational | 1 | 8 |

MOBILE TERMINAL AND OPERATING METHOD THEREOF

Pursuant to 35 U.S.C. §119(a), this application claims the benefit of earlier filing date and right of priority to Korean Patent Application No. 10-2004-0089288, filed on Nov. 4, 2004, the content of which is hereby incorporated by reference herein in its entirety.

BACKGROUND

1. Field

The document relates to a mobile terminal.

2. Description of the Related Art

A mobile terminal (e.g., a mobile phone, a personal digital assistance (PDA), an iBook phone, and a smart phone), which can be carried by users and provide a variety of functions, is widely used. The mobile terminal provides a variety of functions such as a communication function, a wireless internet function, a diary function, a photographing/reproducing function, and an entertainment function. Currently, the mobile terminal attracts mainly young generations by providing a multimedia function.

As is revealed by the fact that the performance of a camera mounted on the mobile terminal approaches that of the digital camera, the image reproduction/photographing function of the mobile terminal is enhanced to a high level. For example, the number of pixels adopted for an LCD of the mobile terminal increases up to the level of five mega pixels and optical technology associated with a lens is integrated into the mobile terminal.

That is, it is possible to take a photograph of high quality by supporting an optical zoom (an image itself is enlarged using an optical principle, so that image quality does not change even when the image is enlarged) as well as supporting a digital zoom (an image is enlarged through an imaging process with the number of pixels unchanged, so that image quality is degraded when the image is enlarged).

However, the current optical zoom camera type mobile terminal does not provide sufficient features associated with meta information set and stored when an image is taken.

Even in the case where the related art camera type mobile terminal (i.e., a camera phone) provides meta information, it deals only an "image size", a "generation date", "resolution", and a "file name". An optical zoom camera type mobile terminal provides much less features associated with the meta information.

Therefore, a user of a high performance mobile terminal having an optical zoom camera requires a function of extracting and checking meta information, which is set when an image is taken, before the reproduction of the taken image, and a function of inserting the meta information into an image file when storing the image after photographing the image so that the meta information can be used afterward.

Accordingly, there is required a method for allowing a user to more efficiently use image meta information in an optical zoom camera type mobile terminal.

SUMMARY OF THE INVENTION

Accordingly, the present invention is directed to a mobile terminal and an operating method thereof that substantially obviate one or more problems due to limitations and disadvantages of the related art.

An object of the present invention is to provide a mobile terminal and an operating method thereof that allow meta information corresponding to shooting conditions to be inserted into an image file in the case where photographed image data is stored in the format of an image file.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a mobile terminal including: a shot setting part for setting shooting conditions; an image input part for photographing an image using an optical zoom lens on the basis of the set shooting conditions and processing the photographed image; a meta information extractor for extracting the shooting conditions set by the shot setting part as meta information; and a meta information inserting part for inserting the meta information extracted from the meta information extractor into the image processed by the image input part.

In another aspect of the present invention, there is provided a method for driving a mobile terminal, the method including: setting shooting conditions; photographing an image using an optical zoom lens on the basis of the set shooting conditions and processing the photographed image; extracting the set shooting conditions as meta information; and inserting the extracted information into the processed image.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 3 is an exemplary diagram illustrating a data type of shot setting information applied to a mobile terminal of the present invention;

FIG. 6 is a view of a table illustrating an EXIF tag used for an IFD0 in a mobile terminal of the present invention;

FIG. 7 is a view of a table illustrating a data format of an EXIF tag field in a mobile terminal of the present invention;

DETAILED DESCRIPTION OF THE INVENTION

Reference will now be made in detail to the preferred embodiments of the present invention, examples of which are illustrated in the accompanying drawings.

Figure 1:
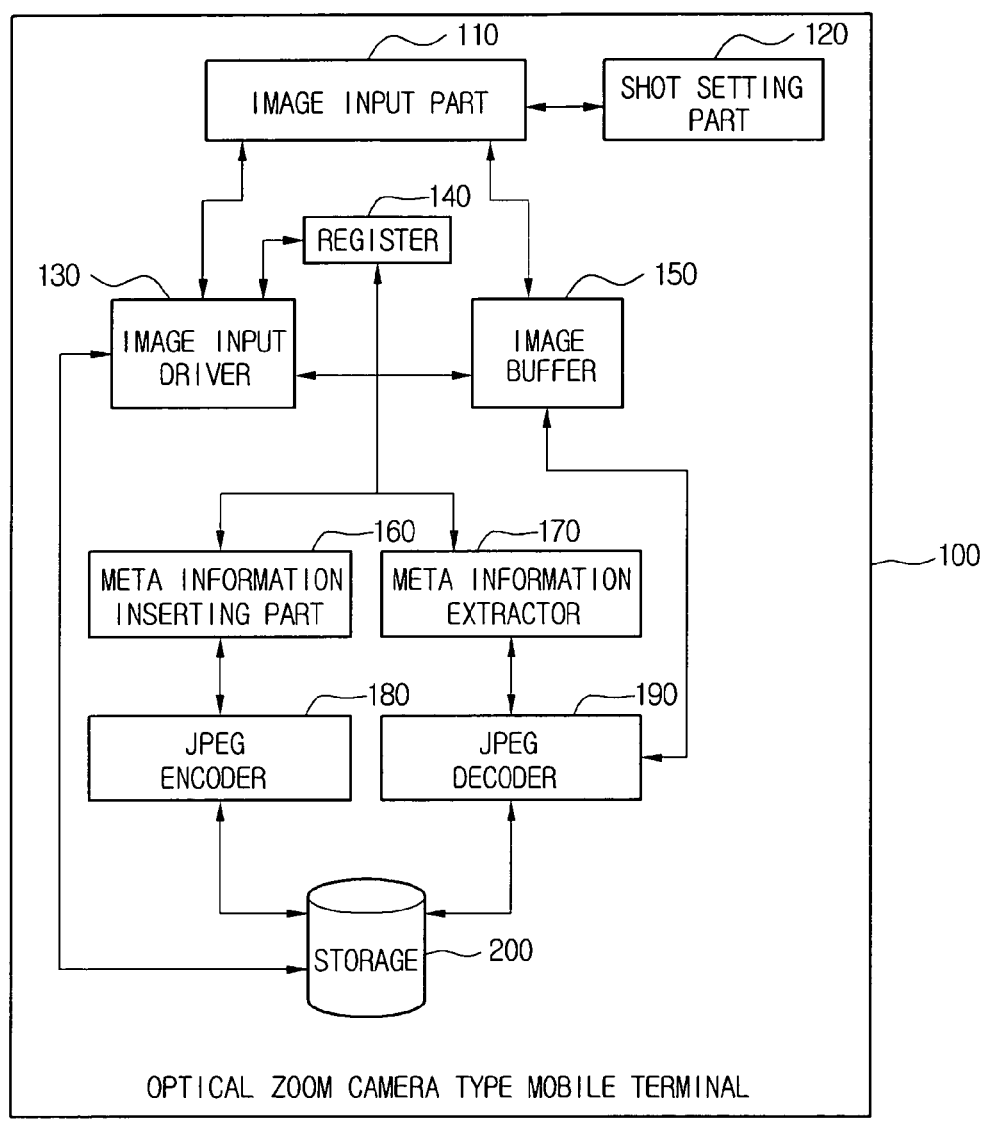
FIG. 1 is a schematic block diagram of a mobile terminal for providing image meta information according to the present invention.
Figure 2:
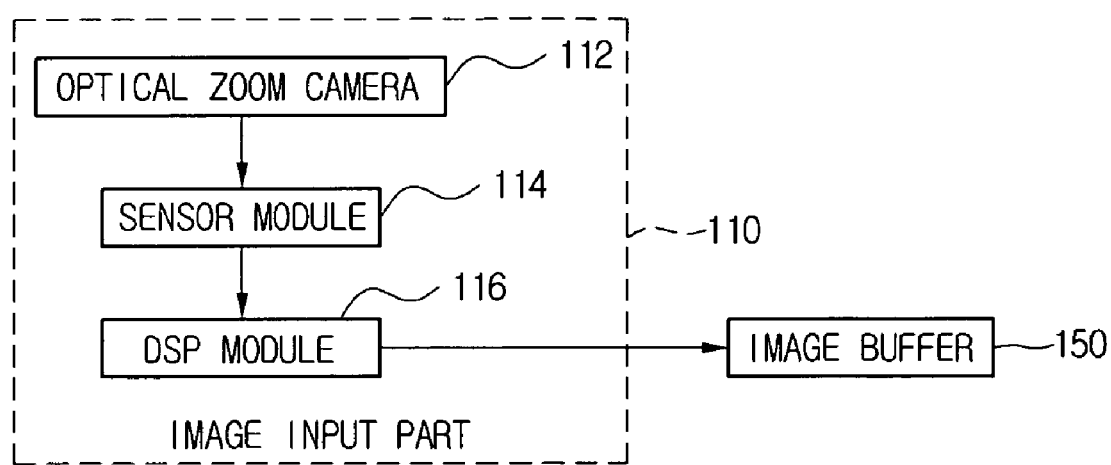
FIG. 2 is a schematic block diagram of an image input part applied to a mobile terminal of the present invention.

FIG. 1 is a schematic block diagram of a mobile terminal for providing image meta information according to the present invention, and FIG. 2 is a schematic block diagram of an image input part applied to a mobile terminal of the present invention.

Referring to FIG. 1, the mobile terminal includes an image input part 110, an shot setting part 120, an image input driver 130, an image buffer 150, a meta information inserting part 160, a JPEG encoder 180, a meta information extractor 170 and a JPEG decoder 190.

Referring to FIG. 2, the image input part 110 has an optical zoom camera 112 and photographs an image under shot setting information set by the shot setting part 120. The image input part 110 has a sensor module 114 and a digital signal processor (DSP) module 116 to process a photographed image. In detail, light signal inputted through the optical zoom camera 112 is converted into image data by the sensor module 114, and the DSP module 116 signal-processes the image data to convert the image data into a color signal expressed in a predetermined color space.

The image buffer 150 stores image data outputted from the image input part 110. The shot setting part 120 sets a plurality of shot setting information. At this point, data inputted through a user interface, existing sensor data, and hardware data of the JPEG decoder 190 can be used.

The above shot setting information includes shooting information, image information, file information, and device information.

FIG. 3 is an exemplary diagram illustrating a data type of shot setting information applied to a mobile terminal of the present invention.

Referring to FIG. 3, shooting information 10 can include ISO setting value, an exposure time, a focal length, a shutter speed, a numerical aperture, and whether a flash is used. The image information can include an image size and the resolution of an image.

Also, the file information 30 can include a file generation date and a file name, and the device information 40 can include a manufacturing company and a model name. The information set when an image is photographed is used to generate image meta information.

The image input driver 130 stores the shot setting information. At this point, the information is stored in a provided register 140. The image input driver 130 can be connected with the image input part 110 through an interface such as an inter integrated circuit (I2C) and receives an output stream from the image input part 110 through the interface. The I2C provides a serial bus for both directions of two lines that provide a communication link between integrated circuits. That is, the I2C provides an interface between devices having address spaces of different bits and operating under different voltages.

The image input driver 130 controls a stable input/output of data through a clock input of the image input part 110 and the register 140.

The meta information extractor 170 extracts image meta information. In detail, the meta information extractor 170 can extract the meta information from a JPEG file or the shot setting information.

A process for extracting, at the meta information extractor 170, image meta information from a JPEG file will be described below.

Figure 4:
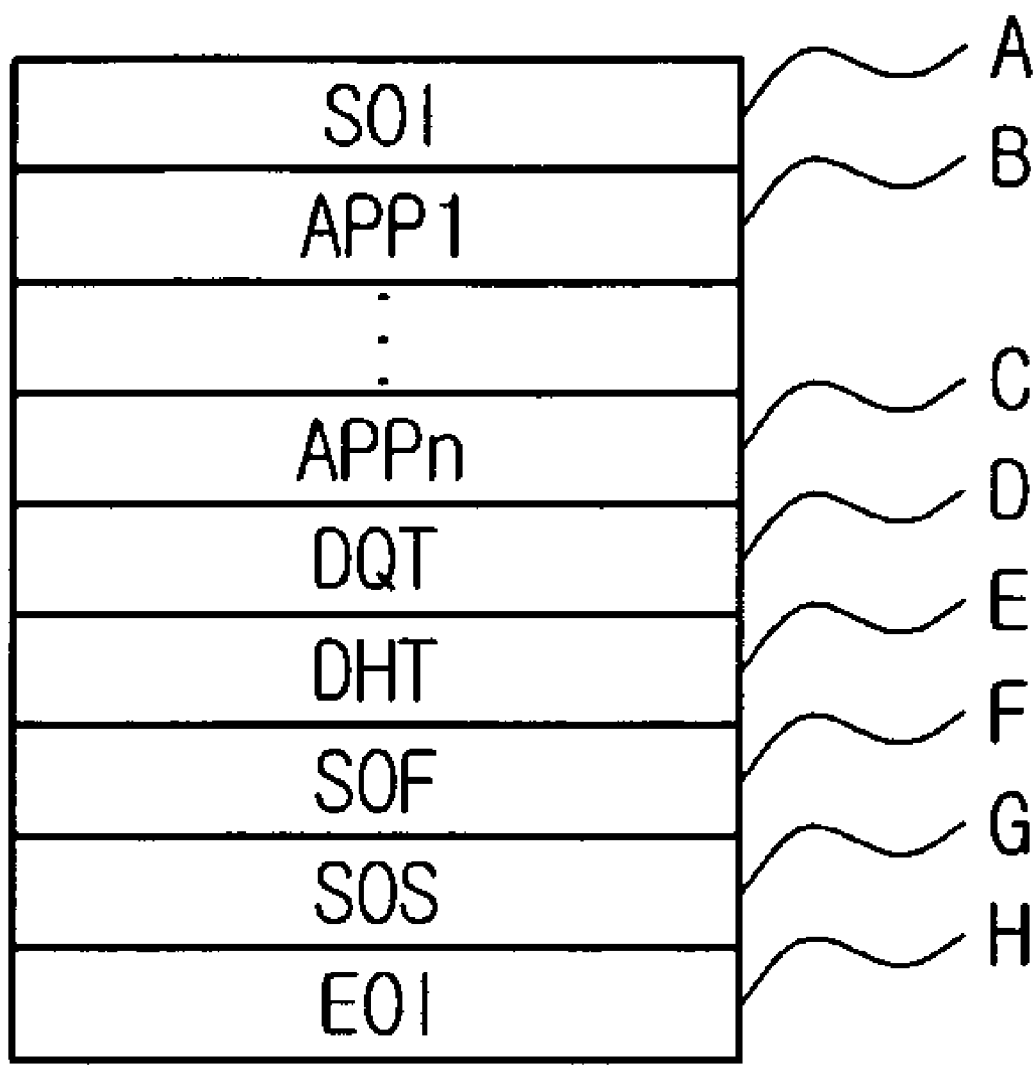
FIG. 4 is a schematic data diagram illustrating the structure of a JPEG file.

FIG. 4 is a schematic data diagram illustrating the structure of a JPEG file.

Referring to FIG. 4, the JPEG file includes SOI (A), APP1 (B), $APP_n$ (C), DQT (D), DHT (E), SOF (F), SOS (G), and EOI (H). Respective data blocks are divided by a marker having a 2-byte size and starting with 0xFF. Some data blocks are ended with the marker and other data blocks have data attached after the marker and expressing additional information.

SOI (start of image) (A) represents a start point of a JPEG file, and DQT (define quantization table) (D) defines a quantization table. Also, DHT (define Huffman table) (E) is a table defining a Huffman code, and SOF (start of frame) (F) represents a start point of an image frame. Also, SOS (start of scan) (G) helps to read an image frame, and EOI (end of image) (H) represents the end of an image.

Also, APP1 (application marker segment 1) (B) is a data block related to meta information generated when an image is photographed, and $APP_n$ (application marker segment n) (C) is a series of data blocks containing other extension information.

The APP1 (B) is a data block directly related to image meta information providing function of a mobile terminal according to the present invention. The APP1 (B) stores exchangeable image format (EXIF) data used when the image meta information is stored.

Figure 5:
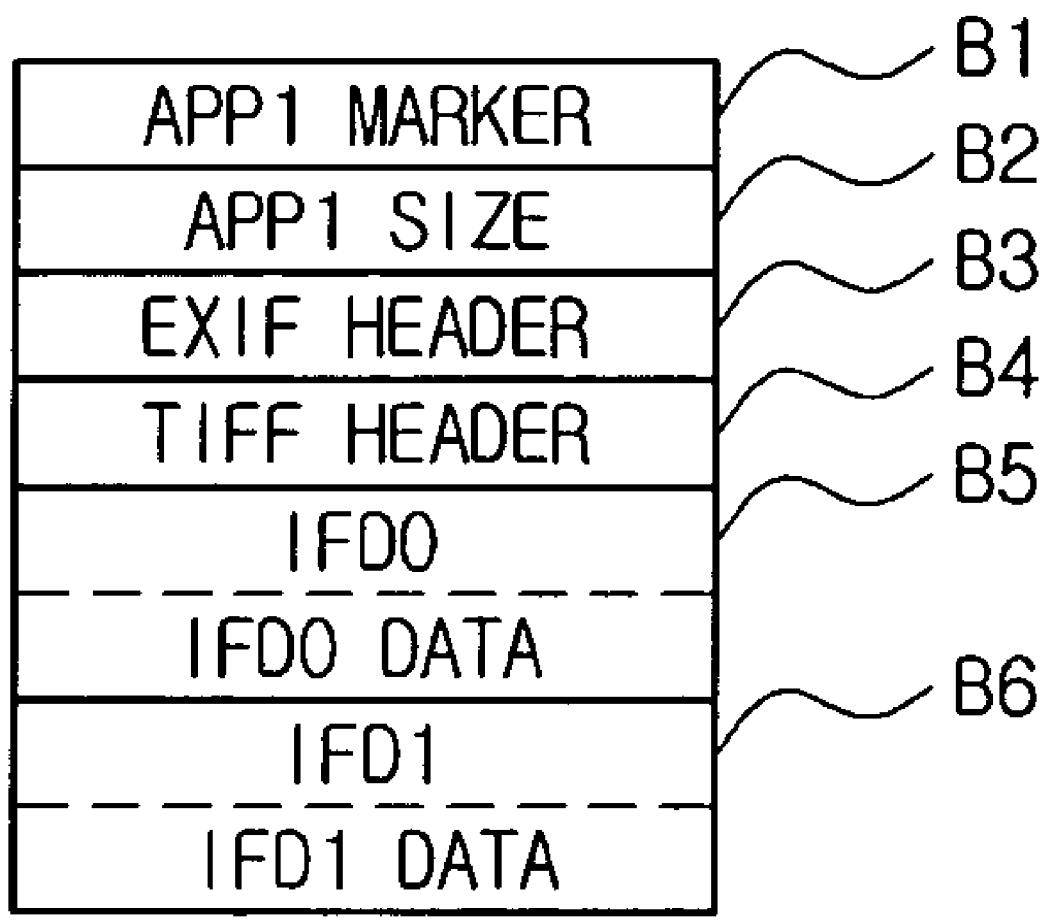
FIG. 5 is a schematic data diagram illustrating the structure of an APPI file.

FIG. 5 is a schematic data diagram illustrating the structure of an APPI file.

Referring to FIG. 5, an APP1 (B1) file is divided into APP1 marker (B1), APP1 size (B2), EXIF header (B3), TIFF header (B4), IFD0 region (B5), and IFD1 region (B6).

The APP1 marker (B1) having a value 0xFFE1 is designed for dividing an APP1 data block, and the APP1 size (B2) represents the entire length of a data block. Also, the EXIF header (B3) prescribes the format of a tag table for recording image meta information on the IFD (image format directory) regions (B5 and B6), and TIFF (tag image file format) header (B4) prescribes the data format of each tag field.

In the IFD0 region (B5), respective image meta information entries (directories) have unique tag identifiers that meet a TIFF standard, and meta information that corresponds to the respective entries is stored after the tag identifiers. In the IFD1 region (B6), an information of thumbnail image is stored.

The meta information extractor 170 extracts the image meta information according to the APP1 structure of the JPEG file. According to the embodiment of the present invention, nine pieces of image meta information are provided.

The reason nine pieces of image meta information are provided among lots of meta information is that increase of an overhead for the JPEG file due to increasing size of the image meta information is prevented and that sufficient image information can be provided to a user of a mobile terminal using only nine pieces of image meta information. Of course, the number of image meta information can be increased or decreased depending on the design of the mobile terminal.

The overhead of image meta information has a size of 64 KB at the maximum and a size of 5 KB in general within a range not exceeding the size of an actual image. According to the present invention, since a data block having a size less than 4 KB can be formed, it is not a large overhead for an entire image.

FIG. 6 is a view of a table illustrating an EXIF tag used for an IFD0 in a mobile terminal of the present invention.

As described above, the EXIF of the present invention has nine tags, which form tag fields for a manufacturing company (a1), a device model (a2), an exposure time (a3), a numerical aperture (a4), an international standards organization (ISO) value (a5), a shutter speed (a6), a lens diameter (a7), whether a flash is used (a8), and a focal length (a9), respectively.

The tag field has a unique tag code and a different data format (type). For example, referring to FIG. 6, a tag (a1) "Make" representing a manufacturing company starts with 2-byte value of "0x010F", and a data type of an image meta information actually stored is stored in a "string" type.

FIG. 7 is a view of a table illustrating a data format of an EXIF tag field in a mobile terminal of the present invention.

FIG. 7 prescribes in detail data formats for respective tag fields including a manufacturing company (b1), a device model (b2), an exposure time (b3), a numerical aperture (b4), an ISO value (b5), a shutter speed (b6), a lens diameter (b7), whether a flash is used (b8), and a focal length (b9).

For example, examination of the tag field of the exposure time (b3) shows that a data format thereof is an "unsigned rational" type and 8-byte is assigned to one component. That is, a data type of a rational function type is used, in which the front four bytes form a numerator value and the rear four bytes form a denominator.

The meta information extractor 170 provides a user interface to receive permission as to generation of image meta information from a user and then generates the image meta information because shot setting information generated into the image meta information may expose personal information of a user.

The meta information extractor 170 can generate the image meta information from the shot setting information, or extract the image meta information from an existing JPEG file. In the case where the meta information extractor 170 generates the image meta information from the shot setting information, the meta information extractor 170 generates the image meta information which will be recorded on nine entries from the shot setting information according to the EXIF standard or the TIFF standard and stores the same.

In the case where the meta information extractor 170 extracts the image meta information from the existing JPEG file, the meta information extractor 170 analyzes the EXIF header (B3) and the TIFF header (B4) of the APP1 region to extract nine pieces of image meta information.

When the meta information extractor 170 extracts the image meta information from the JPEG file, the mobile terminal of the present invention displays the image meta information on a screen to provide the same to a user.

The JPEG encoder 180 reads image data from the image buffer 150 to generate a JPEG file. That is, the JPEG encoder 180 compresses an image according to a compression standard. Red-green-blue (RGB) data of respective pixels is converted into data on YUV color space (Y: brightness, U: hue, and V: saturation) which is used as a standard, and an entire image is divided into sections having a size of 8×8 pixel, so that discrete cosine transform (DCT) process is performed.

Subsequently, the JPEG encoder 180 encrypts image data through quantization and entropy coding.

When the JPEG encoder 180 generates a JPEG file, the meta information inserting part 160 inserts nine pieces of image meta information extracted by the meta information extractor 170 into the header and the entries of the JPEG file. An encoded JPEG file is stored in a storage 200.

The JPEG decoder 190 parses a JPEG file and decompresses a compressed image to display the image. The meta information extractor 170 may extract the image meta information independently of the JPEG decoder 190.

Next, a method for providing, at a mobile terminal, image meta information will be described with reference to FIGS. 8 and 9.

Figure 8:
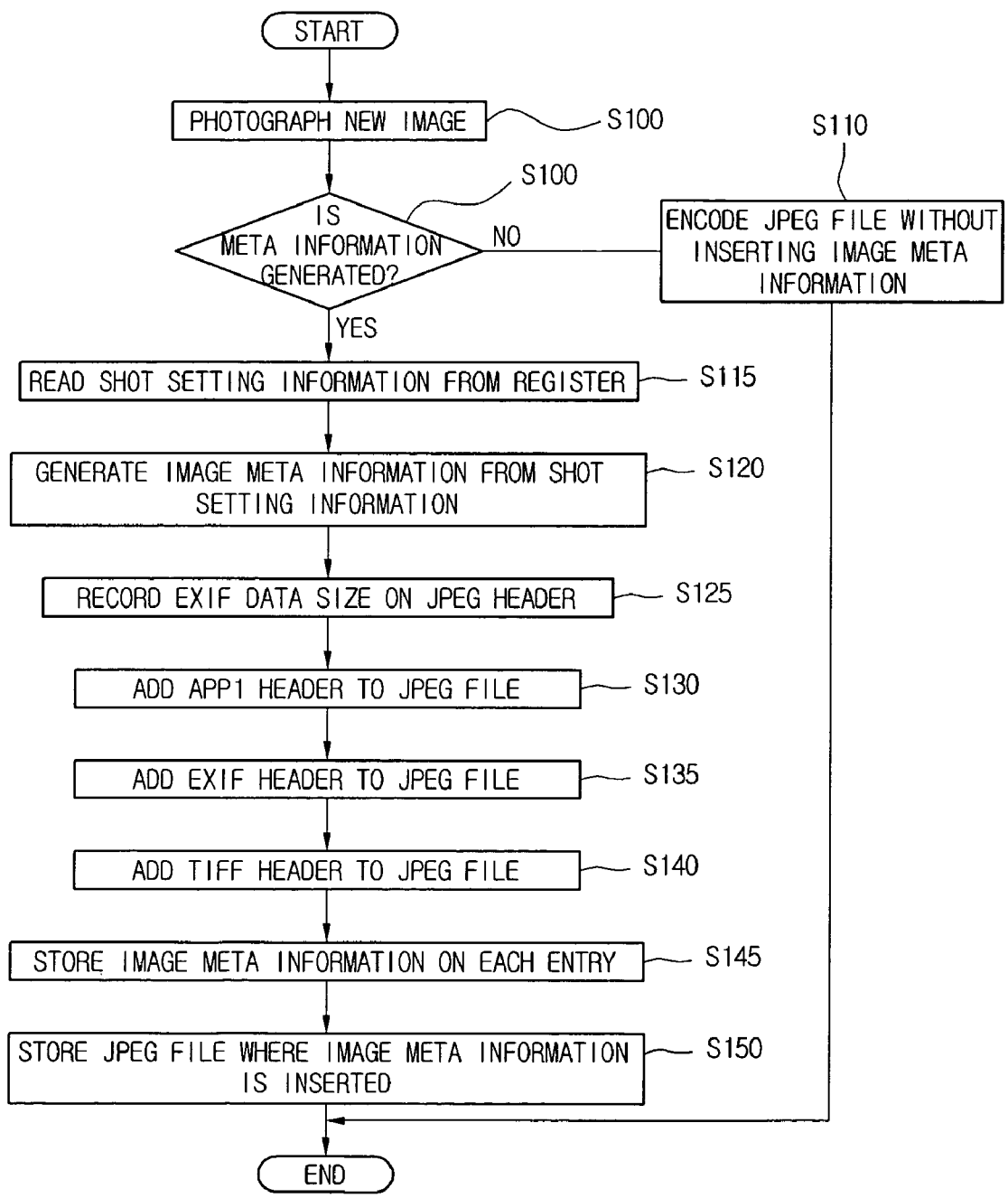
FIG. 8 is a flowchart of a method for extracting, at a mobile terminal of the present invention, image meta information from shot setting information and inserting the extracted meta information into an image file.

FIG. 8 is a flowchart of a method for extracting, at a mobile terminal of the present invention, image meta information from shot setting information and embedding the extracted image meta information into an image file.

In the case where a user photographs a new image and stores the image in a JPEG file (S100), the meta information extractor 170 receives permission as to generation of image meta information from a user before the JPEG encoder 180 encodes the JPEG file (S105).

At this point, when a user refuses to generate the image meta information, the JPEG encoder 180 generates the JPEG file in which the image meta information is not inserted without intervention of the meta information inserting part 160 (S110).

In the case where the generation of the meta information is permitted by a user in the operation S105, the meta information extractor 170 reads the shot setting information from the register 140 (S115) and generates the image meta information from the shot setting information (S120). Before the JPEG encoder 180 encodes a JPEG file, the meta information inserting part 160 adds (embeds) the image meta information into a JPEG header (S125 to S145). Header data is formed and subsequently entry data is formed through the image meta information.

That is, the meta information inserting part 160 finds out the APP1 marker (B1) to record the size of the EXIF data on a header (B2) (S125), and then adds the APP1 header (S130). The meta information inserting part 160 adds an EXIF header (B3) which prescribes an IFD tag table to a next data block of the APP1 header (S135), and then adds a TIFF header (B4) which prescribes a data format of a tag field (S140).

Last, the meta information inserting part 160 stores the image meta information in respective entries B5 according to the formats of the EXIF header and the TIFF header (S145), and stores a JPEG file in which the image meta information is embedded (S150).

Figure 9:
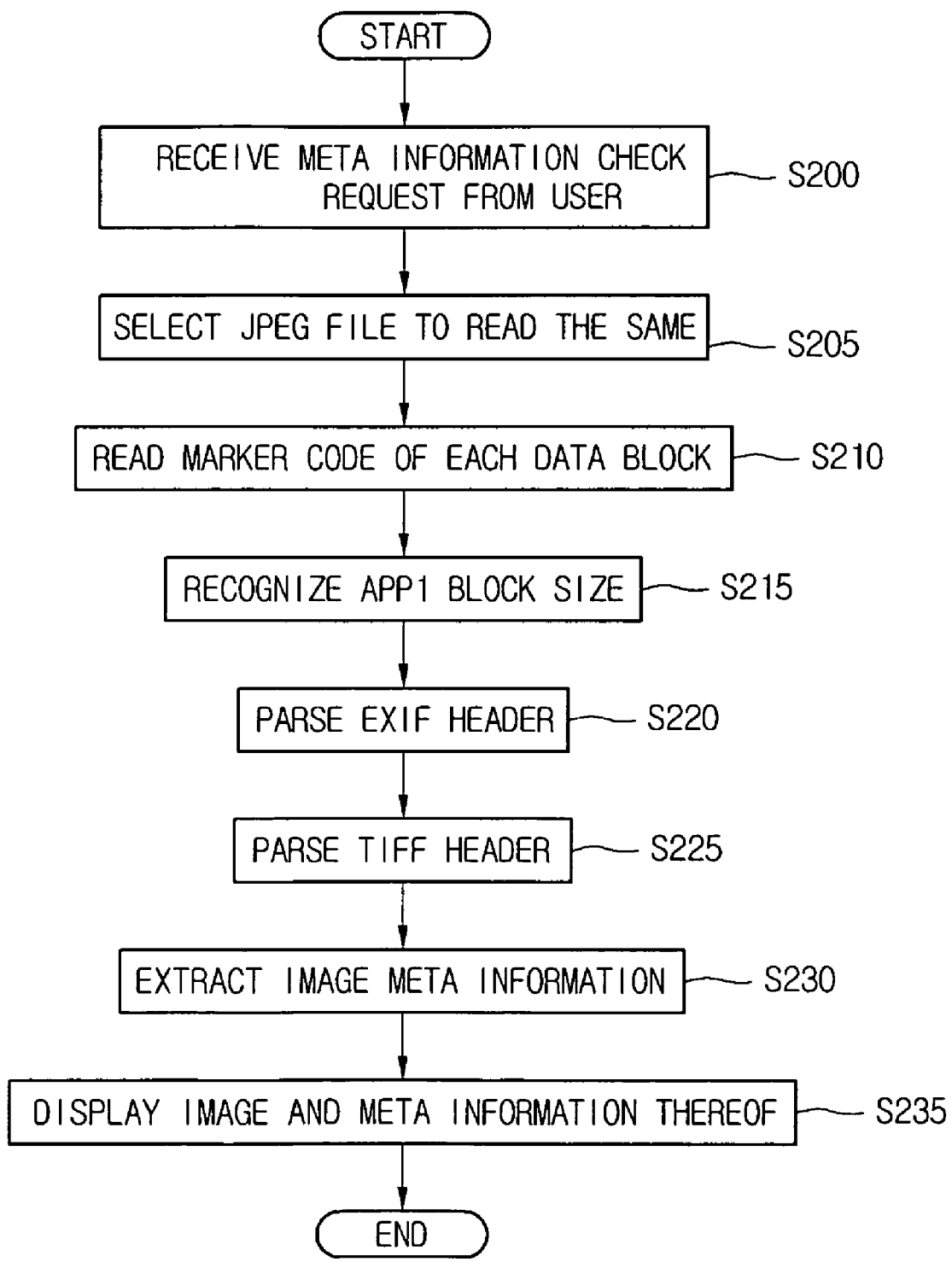
FIG. 9 is a flowchart of a method for extracting, at a mobile terminal of the present invention, image meta information from an image file.

FIG. 9 is a flowchart of a method for extracting, at a mobile terminal of the present invention, image meta information from an image file.

In the case where a user requests checking of the image meta information on a JPEG file or other existing JPEG file in which the image meta information of the present invention is embedded (S200), the meta information extractor 170 selects and receives a JPEG file generated by the meta information inserting part 160 and the JPEG encoder 180, or other existing JPEG file and then read the same from the storage 200 (S205). At this point, the existing JPEG file can be a JPEG file inputted from other image apparatus such as other mobile terminal and other digital camera.

Next, the meta information extractor 170 reads a marker code B1 of each data block (S210) and recognizes an APP1 block size B2 (S215). The meta information extractor 170 analyzes tag data according to formats of an EXIF header B3 and a TIFF header B4 (S220 and S225), and extracts image meta information B5 according to the analysis results (S230).

Finally, the inventive mobile terminal displays the extracted image meta information (S235), so that a user can use the image meta information.

As described above, according to the mobile terminal of the present invention, a user photographs an image using an optical zoom camera and can embed variety of image meta information into an JPEG file when storing the image.

Also, a user can extract the meta information from the JPEG file of the photographed image to check shot setting information and can share the image meta information with the digital camera and the optical zoom camera of the related art.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A mobile terminal comprising:
a shot setting unit for setting shooting conditions;
an image input unit for photographing an image according to the set shooting conditions and processing the photographed image;
a user interface for receiving a user input for determining whether to generate meta information associated with the set shooting conditions,
wherein the user input is received before the processing of the photographed image in the image input unit;
a meta information extractor for extracting the set shooting conditions and generating the meta information associated with the extracted shooting conditions according to the received user input; and
a meta information inserting unit for inserting the meta information generated from the meta information extractor into the image processed by the image input unit, according to the received user input, to generate a meta information inserted file,
wherein a data block of the meta information has a size less than 4 KB.

2. The mobile terminal according to claim 1, wherein the meta information inserting unit inserts the meta information generated from the meta information extractor into a JPEG (joint photographic experts group) file.

3. The mobile terminal according to claim 2, wherein the meta information inserted into the JPEG file is inserted according to a JFIF (JPEG file interchange format) structure.

4. The mobile terminal according to claim 2, wherein the meta information inserting unit inserts the meta information according to formats of an EXIF (exchangeable image format) header and a TIFF (tag image file format) header within a JPEG file header.

5. The mobile terminal according to claim 1, wherein the set shooting conditions comprise at least shooting information, image information, file information, or device information.

6. The mobile terminal according to claim 5, wherein the shooting information comprises at least device manufacturing company information, device model information, exposure time information, numerical aperture information, ISO setting information, shutter speed information, lens diameter information, flash use information, focal length information, image size information, image resolution information, file generation date information, or file name information.

7. The mobile terminal according to claim 1, wherein the meta information extractor extracts shooting conditions embedded in meta information of an input image file.

8. The mobile terminal according to claim 7, wherein the input image file is a JPEG file, and the meta information extractor analyzes the JPEG file according to a JFIF structure to extract the shooting conditions.

9. The mobile terminal according to claim 7, wherein the meta information extractor analyzes tag data according to formats of an EXIF header and a TIFF header of an input JPEG file to extract shooting conditions.

10. The mobile terminal according to claim 1, further comprising an image output unit for displaying the meta information generated from the meta information extractor.

11. The mobile terminal according to claim 1, wherein the meta information extractor further provides a user interface to receive the user input to generate the meta information.

12. The mobile terminal according to claim 1, wherein the meta information extractor extracts nine variables from the set shooting conditions.

13. The mobile terminal according to claim 1, wherein a size of the meta information is less than a size of the image.

14. A method for driving a mobile terminal, the method comprising:
setting shooting conditions;
photographing an image, via an image input unit, according to the set shooting conditions and processing the photographed image;
receiving a user input for determining whether to generate meta information associated with the set shooting conditions, wherein the user input is received before the processing of the photographed image in the image input unit;
extracting the set shooting conditions and generating the meta information using the extracted shooting conditions according to the received user input,
wherein a data block of the generated meta information has a size less than 4 KB; and
inserting the generated meta information into the processed photographed image, according to the received user input, to generate a meta information inserted file.

15. The method according to claim 14, wherein the generated meta information is inserted into a JPEG file.

16. The method according to claim 15, wherein the generated meta information inserted into the JPEG file is inserted according to a JFIF (JPEG file interchange format) structure.

17. The method according to claim 15, wherein the generated meta information inserted into the JPEG file is inserted according to an EXIF (exchangeable image format) header and a TIFF (tag image file format) header within a JPEG file header.

18. The method according to claim 14, wherein the set shooting conditions comprise at least shooting information, image information, file information, or device information.

19. The method according to claim 18, wherein the shooting information comprises at least device manufacturing company information, device model information, exposure time information, numerical aperture information, ISO setting information, shutter speed information, lens diameter information, flash use information, focal length information, image size information, image resolution information, file generation date information, or file name information.

20. The method according to claim 14, further comprising: extracting shooting conditions embedded in meta information of an input image file.

21. The method according to claim 20, wherein the input image file is a JPEG file, and the extracting of the shooting conditions embedded in the meta information comprises analyzing the JPEG file according to a JFIF structure to extract the shooting conditions.

22. The method according to claim 20, wherein the input image file is a JPEG file, and the extracting of the shooting conditions comprises reading a marker code of the JPEG file according to a JFIF structure, recognizing an APP1 block size, and analyzing tag data according to formats of an EXIF header and a TIFF header of the JPEG file.

23. The method according to claim 14, further comprising: displaying the generated meta information.

24. The method according to claim 14, wherein extracting the shooting conditions extracts nine variables from the set shooting conditions.

25. The mobile terminal according to claim 14, wherein a size of the data block of the generated meta information is less than a size of the image.

\* \* \* \* \*